(12) United States Patent
Haller et al.

(10) Patent No.: US 12,722,277 B2
(45) Date of Patent: Sep. 1, 2026

(54) SWERVE-DRIVE ROBOT

(71) Applicant: Cardinal Gibbons High School, Raleigh, NC (US)

(72) Inventors: Kevin Nicolas Haller, Chapel Hill, NC (US); William Michael Meyers, Chapel Hill, NC (US); Joseph Michael Biersack, Morrisville, NC (US); Julia Mary Biersack, Morrisville, NC (US); Ian Setia, Raleigh, NC (US); Rachael Setia, Raleigh, NC (US); Andrew John Andersen, Wake Forest, NC (US); Ethan Christopher Emerton, Cary, NC (US); Thomas Leland Hughes, Raleigh, NC (US); William Charles Holt, Raleigh, NC (US); Wyatt John Nicholson, Cary, NC (US)

(73) Assignee: Cardinal Gibbons High School, Raleigh, NC (US)

( * ) Notice: Subject to any disclaimer, the term of this patent is extended or adjusted under 35 U.S.C. 154(b) by 295 days.

(21) Appl. No.: 18/414,089

(22) Filed: Jan. 16, 2024

(65) Prior Publication Data

US 2024/0149433 A1 May 9, 2024

(51) Int. Cl.

| | |
|---|---|
| ***B25J 5/00*** | (2006.01) |
| ***B25J 9/16*** | (2006.01) |
| ***B25J 15/00*** | (2006.01) |
| ***B60B 19/00*** | (2006.01) |

(52) U.S. Cl.
CPC ............. *B25J 5/007* (2013.01); *B25J 9/1697* (2013.01); *B25J 15/0028* (2013.01); *B60B 19/003* (2013.01)

(58) Field of Classification Search
CPC ........ B25J 5/007; B25J 9/003; B25J 15/0028; B25J 15/0047; B25J 15/0206
USPC .......................................................... 414/373
See application file for complete search history.

(56) References Cited

U.S. PATENT DOCUMENTS

| | | | | |
|---|---|---|---|---|
| 9,864,369 | B2 | 1/2018 | Gravel | |
| 12,310,545 | B1 * | 5/2025 | Hamilton | A47L 7/0085 |
| 12,427,849 | B2 * | 9/2025 | Yan | B60W 60/001 |
| 2019/0039826 | A1 * | 2/2019 | Luckinbill | B25J 9/0084 |
| 2022/0176238 | A1 | 6/2022 | Ozaki | |
| 2023/0303154 | A1 * | 9/2023 | Rabson | B60K 7/0007 |
| 2024/0198372 | A1 * | 6/2024 | Raman | G05D 1/0234 |

FOREIGN PATENT DOCUMENTS

| | | | | |
|---|---|---|---|---|
| CA | 3042416 | A1 * | 1/2020 | B64F 5/30 |
| CN | 116728376 | A * | 9/2023 | B25J 5/007 |
| JP | WO2013038998 | A1 * | 3/2015 | B25J 9/162 |

* cited by examiner

*Primary Examiner* — Saul Rodriguez

(74) *Attorney, Agent, or Firm* — Haynes and Boone, LLP

(57) ABSTRACT

A robot apparatus with a capable and highly maneuverable drive system incorporates two differential swerve drive pods. The robot apparatus further includes a claw mechanism for grasping an object, a passthrough mechanism for moving the object horizontally and a lift mechanism for moving the object vertically. The robot apparatus allows for rapid manipulation and movement of objects such as cones.

20 Claims, 14 Drawing Sheets

115
110
135
118
105
2901
Purple Gears
With Thanks To
haynesboone
120
170
100
160
120
125

110
105
115

130
120
100
130

100
140
150
145
140
110
190

180
130

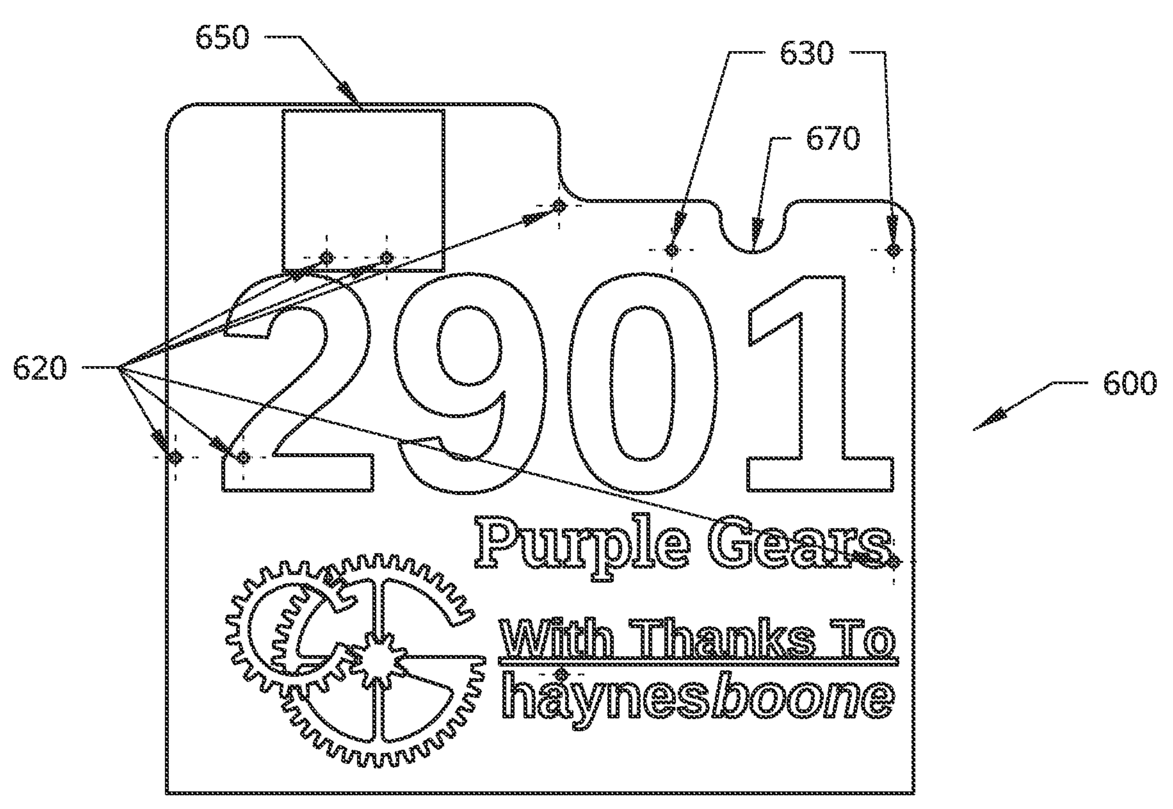
Figure 6
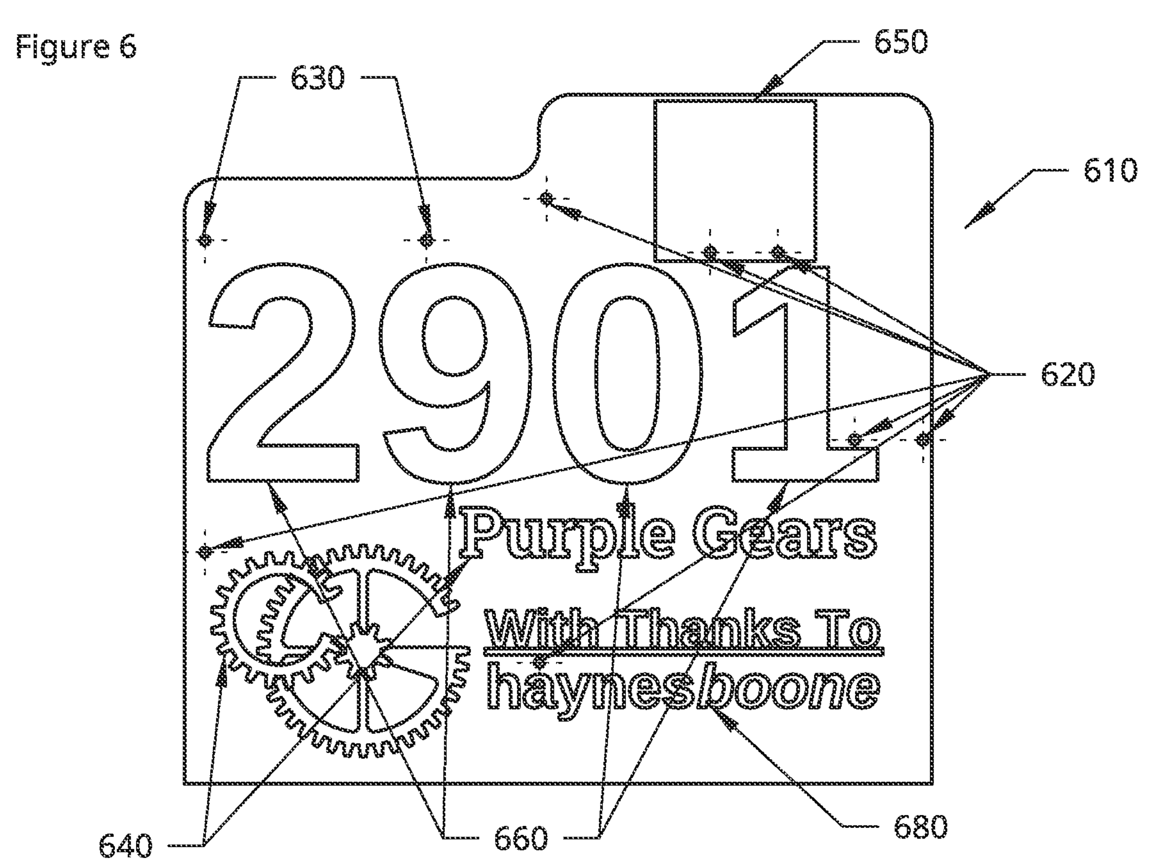

SWERVE-DRIVE ROBOT

TECHNICAL FIELD

The subject matter described herein relates to a novel robot with a swerve-drive maneuvering system. The robot is further equipped with a plunge-style arm, also highly maneuverable, that is useful for grasping an item from an interior surface of the item. This robot may have a particular but not exclusive utility for education, construction, and manufacturing.

BACKGROUND

Robots and similar machinery are becoming increasingly common tools in a variety of industries and settings. In some instances, a robot may be called upon to operate in a tight, confined space or in a situation requiring complex but precise movements. A robot with a known drive system, such as two parallel "tank-style" treads, may be inadequate in such situations, as such drive systems commonly render a robot incapable of maneuvering precisely, potentially resulting in undesirable collisions with walls, barriers, or other structures. Such collisions may cause damage to the robot, to the structure, or to both. Therefore, what is needed in the art is an improved drive system for maneuvering a robot that may allow for highly adaptable and precise movements while maintaining the traction advantages of known drive systems.

BRIEF DESCRIPTION OF THE DRAWINGS

FIG. 6 is a side view of an illustrative side panels.

DETAILED DESCRIPTION

Figures 1A, 1B, 1C, 1D:
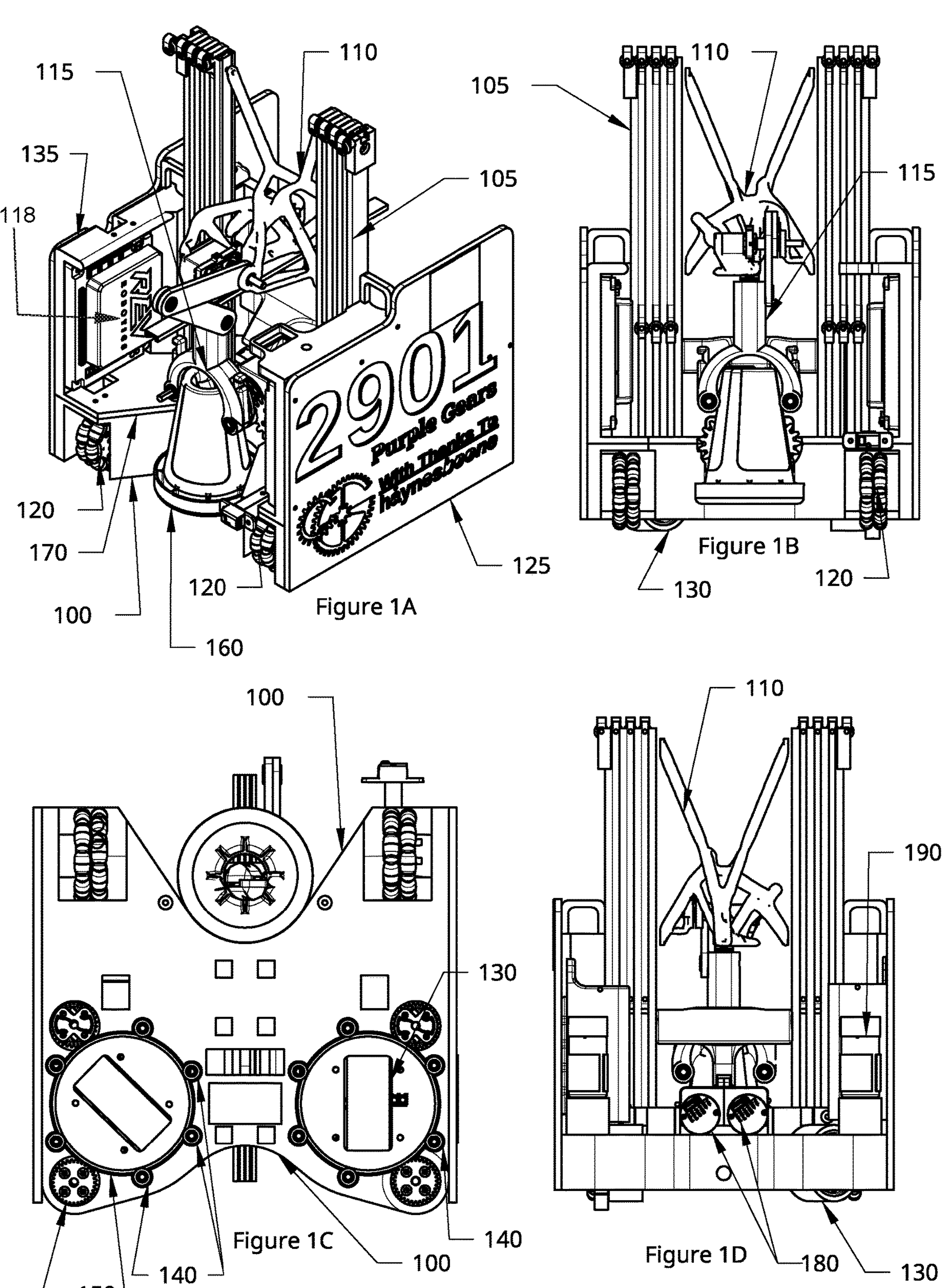
FIG. 1A is a perspective view of a robot embodying principles of the present invention.
FIGS. 1B-1D are, respectively, front, bottom, and rear views of the robot illustrated in FIG. 1A.

FIG. 1A illustrates a perspective view of an exemplary embodiment of a robot 100 equipped with a highly maneuverable swerve-drive system. FIGS. 1B through 1D illustrate front, bottom, and rear views, respectively, of the robot 100.

Robot 100 includes base platform 170 that comprises a novel driving apparatus. The base platform provides a substantially rigid framing structure to support and align the remaining components of robot 100. The base platform 170 may be partly or entirely constructed from aluminum, steel, or another suitably strong and resilient material.

Near the front side of the base platform 170 are two free-spinning odometry omniwheels 120. As the odometry omniwheels 120 are not coupled to any drivetrain, they are allowed to turn freely (both axially and laterally) and provide support for the weight of the robot 100. Odometry omniwheels 120 are attached to rotation sensors (not shown) that provide tracking information used to assist with determining the relative movement of robot 100. At an opposite side of the base platform 170 are two wheels 130, each mounted in a differential swerve drive pod 145. Differential swerve drive pods 145 include gears 150 and v-groove bearings 140. In one embodiment, v-groove bearings 140 may be 1609 Series V-Groove Bearings available from goBILDA of Winfield, KS. Exemplary embodiments of differential swerve drive pods 145 are described in more detail with respect to FIGS. 3-5 below. Also mounted to the base platform 170 are two side plates 125. The side plates 125 are designed to provide side protection for the robot 100 in the event that an object, such as another robot, collides with robot 100. The side plates 125 may also be used to mount additional components and to provide identification for the robot 100, as illustrated, and therefore may be cut from Lexan or another strong plastic. Alternatively, side plates 125 may be formed from any other suitable material such as metal or wood, or from a combination of materials.

Mounted to a top side of the base platform 170 is a superstructure generally comprising a lift mechanism 105 (including lift motors 180), a passthrough mechanism 110, and a plunger claw mechanism 115. Each of these mechanisms is further described below.

Figures 2A, 2B:
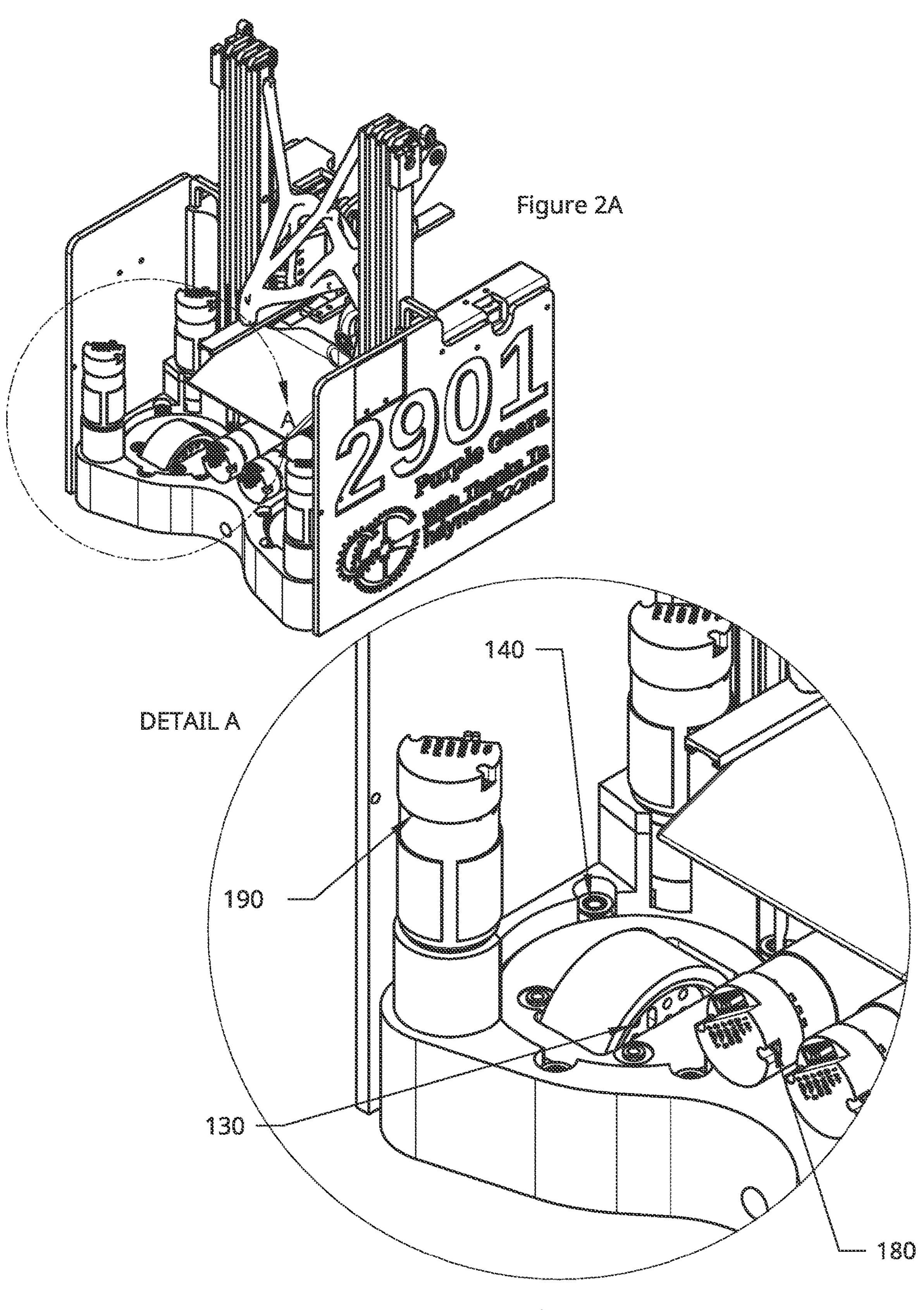
FIG. 2A is a perspective view of a robot embodying principles of the present invention.
FIG. 2B is a detail view of a portion of FIG. 2A.

FIG. 2A shows a perspective view of robot 100. FIG. 2B shows in detail the portion of FIG. 2A labeled as A. Shown in FIG. 2B is differential swerve motor 190 and v-bearing 140. Differential swerve motor 190 is used, in part, to drive wheel 130. Also visible is lift motor 180.

Figures 3A, 3B:
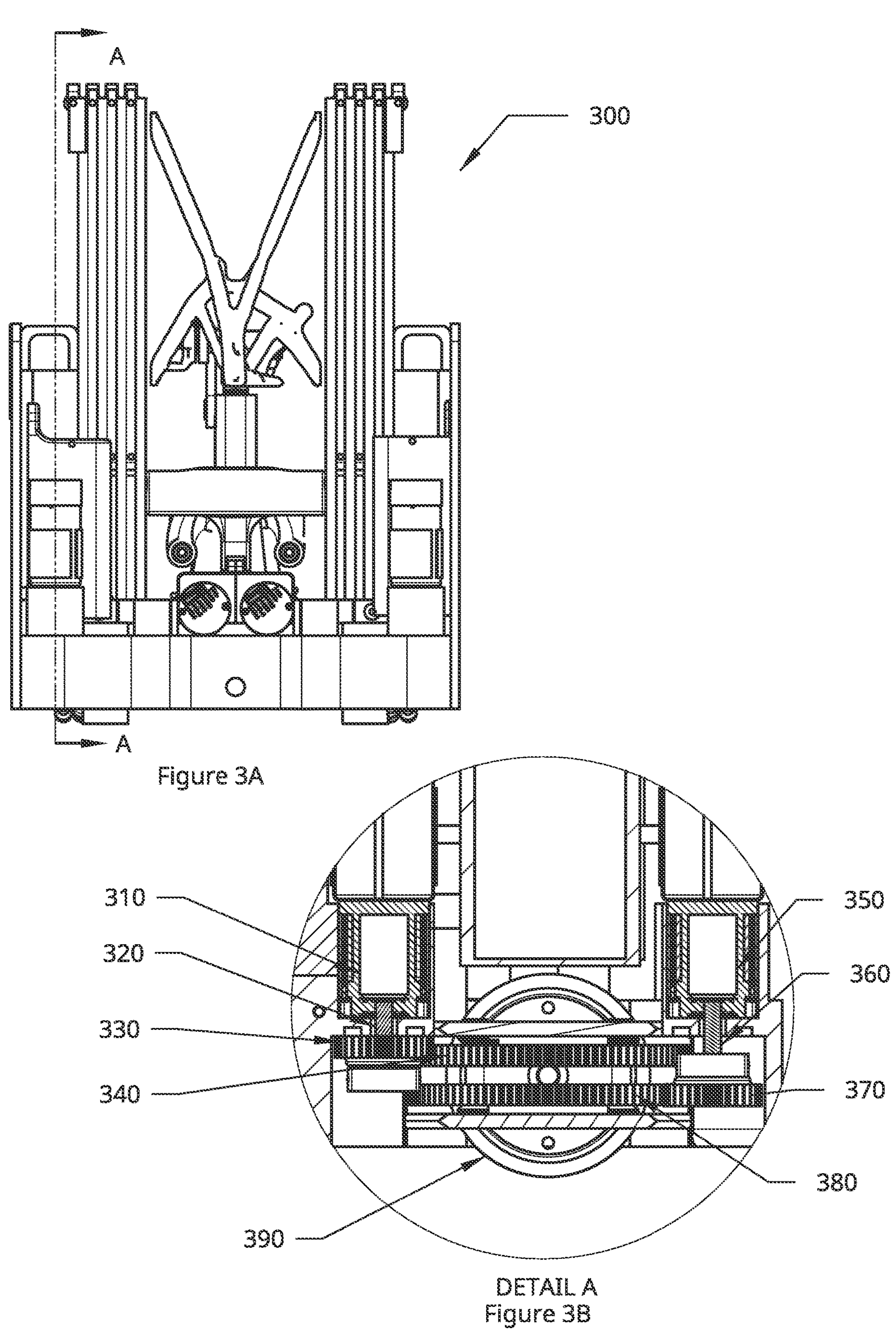
FIG. 3A is a rear view of a robot embodying principles of the present invention.
FIG. 3B is a cutaway detail view of a portion of FIG. 3A.

FIG. 3B shows a cutaway sectional view through line A of FIG. 3A. These figures illustrate more details regarding the components of a differential swerve drive pod, such as differential swerve drive pods 145 shown in FIG. 1C. A differential swerve drive pod includes an upper motor 310 having an upper motor drive shaft 320 coupled to an upper motor gear 330 that enmeshes with an upper swerve drive gear 340. Similarly, a lower motor 350 has a lower motor drive shaft 360 coupled to a lower motor gear 370 that enmeshes with a lower swerve drive gear 380. Upper motor 310 may be driven independently of lower motor 350, thereby allowing upper swerve drive gear 340 to be rotated independently of lower swerve drive gear 380. Through the selective rotations of upper swerve drive gear 340 and lower swerve drive gear 380, wheel 390 may be made to turn around its axis (thus moving robot 100 in a lateral direction along a generally horizontal operating surface, such as a floor), to rotate its axis in a plane parallel to the operating surface (thus changing the robot 100's direction of travel), or a combination of both.

Figure 4:
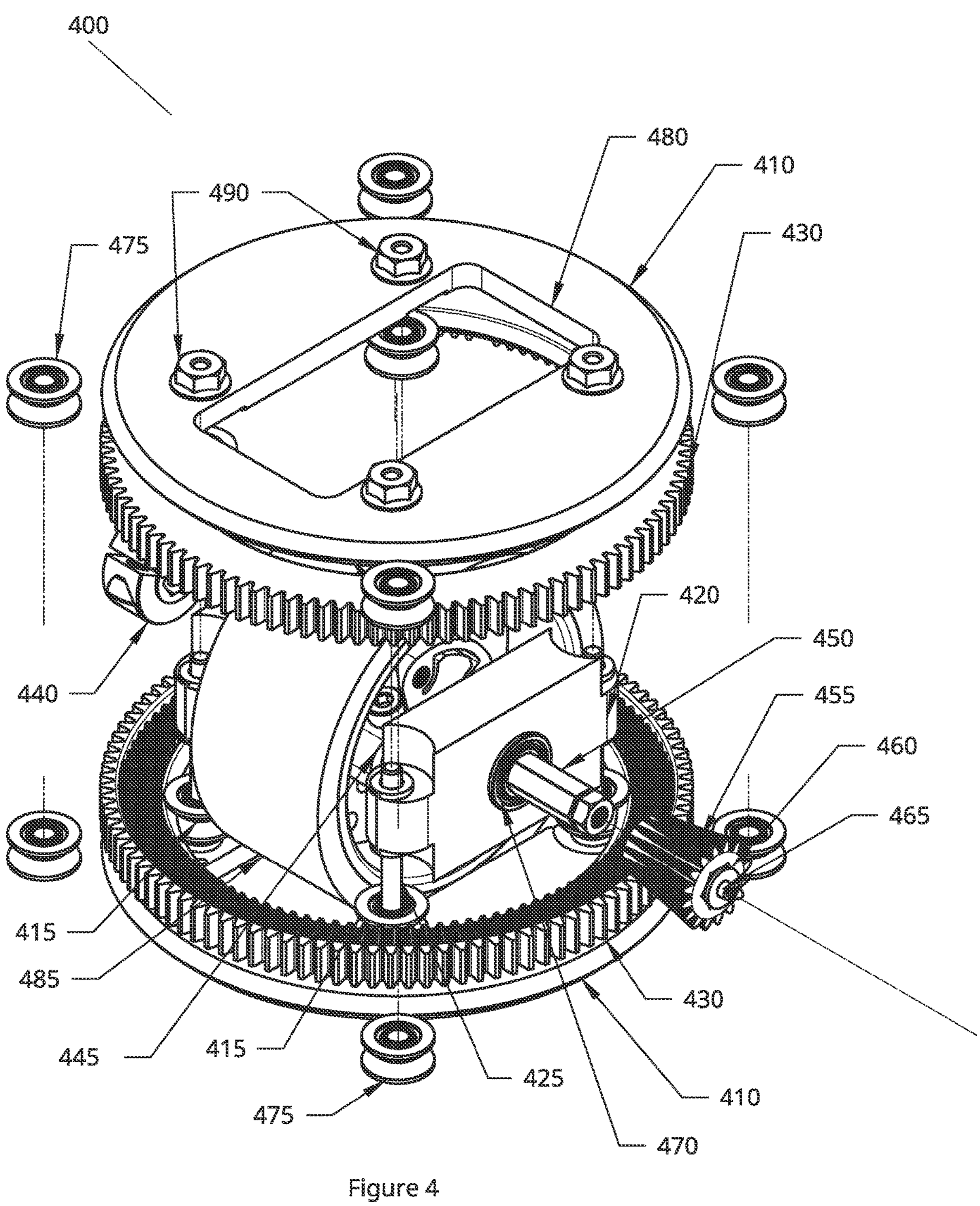
FIG. 4 is an exploded perspective view of portion of a differential swerve drive pod.

FIG. 4 shows an exploded perspective view providing further details regarding the construction and operation of a differential swerve drive pod 400. Differential swerve drive pod 400 includes a wheel 485 on a hub 445 mounted between two supports 420 to an axle 450. Axle 450 may be mounted in supports 420 using bearings 470. Wheel 485 preferably provides a high level of grip and traction, allowing for rapid acceleration, deceleration, and overall agile movement. In some embodiments, wheel 485 may be a 3614 Series Rhino Wheel, hub 445 may be a 1309 Series Sonic Hub, and bearing 470 may be a 1611 Series Flanged Ball Bearing, all available from goBILDA of Winfield, KS. Further mounted to axle 450 is a bevel gear 455, which may be affixed to axle 450 with a washer 460 and screw 465. In one embodiment, bevel gear 455 is 3D printed using PLA filament and has 16 teeth. In other embodiments, other techniques or materials may be used to make bevel gear 455, such as 3D printing using glass-infused nylon filament. A clamping collar 440 may be mounted to axle 450 on an opposite side of wheel 485. In one embodiment, clamping collar 440 is a 2910 Series Aluminum Clamping Collar available from goBILDA of Winfield, KS. Bevel gear 455 enmeshes with inner surfaces of upper and lower compound gears 430. The upper and lower compound gears 430 are each rotatably mounted in four inner v-groove bearings 415 (not all of which are visible). Above the upper compound gear 430 is a top disk 410 with a generally rectangular aperture 480. Similarly, a lower disk 410 (also with a generally rectangular aperture) is mounted below the lower compound gear 430. In one embodiment, disks 410 are 3D printed PLA. When fully assembled, wheel 485 protrudes through the rectangular apertures 480. The lower disk 410, lower inner v-groove bearings 415, support 420, upper inner v-groove bearings 415, and upper disk 410 are mounted together through four bolts 425 affixed with four locking nuts 490. In one embodiment, bolts 425 and locking nuts 490 are M4 sized. The upper and lower disks 410 are each mounted in four outer v-groove bearings 475 located around their respective outer peripheries, allowing the upper and lower disks to rotate about their centers but not move vertically (and hence, the differential swerve drive pod can support the weight of a load attached to the outer v-groove bearings 475 while retaining its ability to drive).

Figure 5:
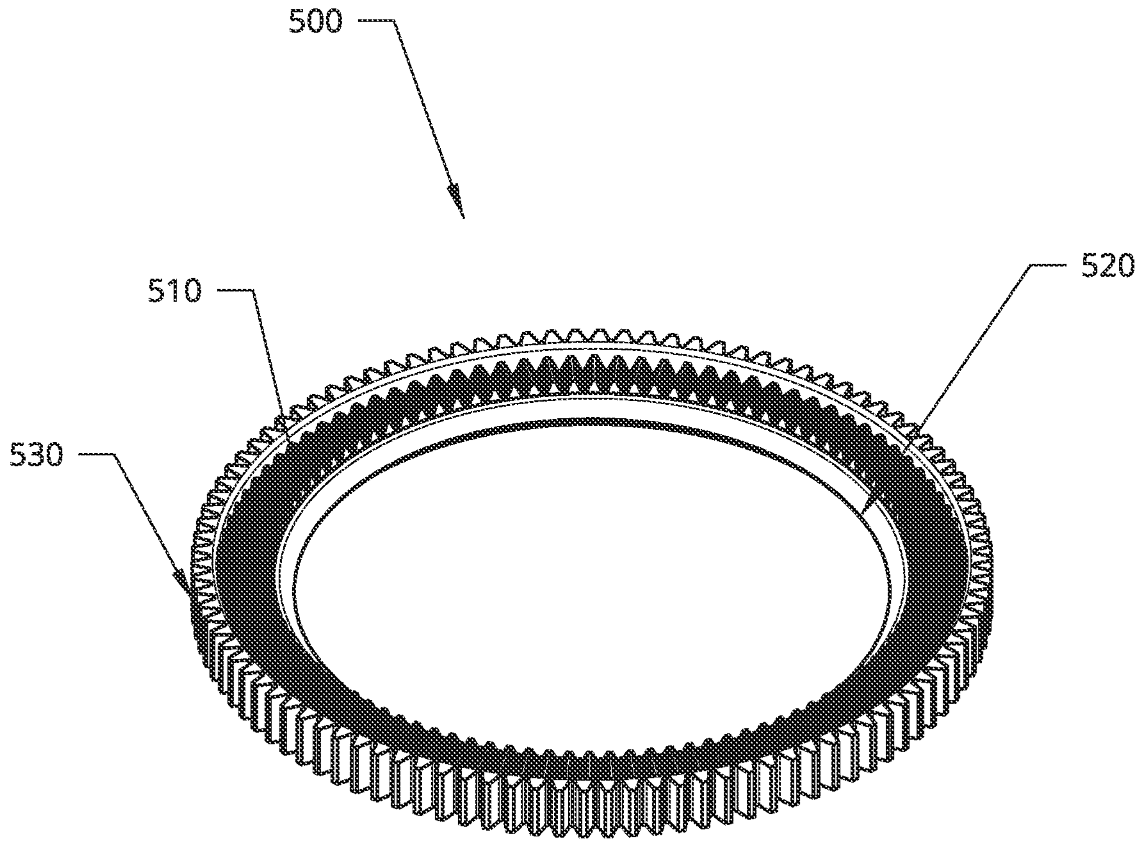
FIG. 5 is a perspective view of a compound gear.

FIG. 5 shows a perspective view of a compound gear 500, which may correspond to either upper or lower compound gear 430. In one embodiment, compound gear 500 is 3D printed using glass-infused nylon filament, but other techniques or materials (such as PLA filament) may be employed. Compound gear 500 includes around its outer circumferential surface a spur gear 530. In one embodiment, spur gear 530 is a 102-tooth gear. Compound gear 500 also includes around its inner circumferential surface an upward facing bevel gear 510. In one embodiment, bevel gear 510 is a 100-tooth gear. It is understood that the number of teeth on any gear may be selected to fit design needs or constraints. However, the inventors have found it useful to drive spur gear 530 with a 34-tooth pinion gear directly coupled to a driving motor, as this provides an overall gear ratio of 25/12 between the drive motor and wheel 485. Thus, for a drive motor capable of achieving 312 rpm, the maximum wheel speed is 650 rpm.

Operation of differential swerve drive pod 400 is as follows. As discussed relative for FIG. 3B, two separate motors are arranged to independently drive upper and lower compound gears 430. When upper and lower compound gears 430 are driven together in the same direction (e.g., both rotating clockwise or counterclockwise together), bevel gear 455 is substantially locked (e.g., bevel gear 455 does not turn about its primary axis of rotation) and wheel 485 is caused to rotate about a vertical axis. If upper and lower compound gears 430 are driven at equal speeds but in opposite directions, then bevel gear 455 will be caused to turn about its primary axis of rotation and wheel 485 will be caused to turn about the axis defined by axle 450. By selectively rotating one or both of upper and lower compound gears 430 at varying relative speeds and/or directions, a combination of driving forces may be achieved. For example, driving only upper compound gear 430 while lower compound gear 430 remains stationary will cause wheel 485 to simultaneously rotate about its vertical axis and the axis defined by axle 450.

Operation of robot 100 equipped with dual differential swerve drive pods 145 will now be described. Robot 100 may be operated in an autonomous driving mode or a telemetry-operated driving mode.

In an autonomous driving mode, drive commands are provided programmatically (e.g., from a computer program or script executing locally or remotely). In autonomous driving, both differential swerve drive pods 145 are initially set to point straight forward, and a limited range of driving commands are employed. Specifically, the differential swerve drive pods 145 are effectively operated as a "tank" drive system. That is, the wheels 130 of differential swerve drive pods 145 are rotated only about their central axis (i.e., forward and backward). The wheels 130 are never rotated about their vertical axes. With reference to the discussion of differential swerve drive pod 400, this means that the upper and lower compound gears 430 are always driven at equal speeds in opposite directions, causing wheel 485 to rotate solely about the axis of shaft 450. Thus, to cause robot 100 to turn, the wheels 130 may be caused to rotate in opposite directions (e.g., one wheel 130 rotates in a forward direction while the other wheel rotates in a backward direction), similar to how a tank turns by causing its left and right treads to move in opposite directions. While operating in an autonomous driving mode, the robot 100 may use information gathered from previous drive commands and the odometry omniwheels 120 to calculate its current position relative to its initial starting position. This current position information may be used to calculate subsequent driving commands.

In a telemetry-operated driving mode, drive commands are provided manually (e.g., from a human driver using a hand- or foot-operated controller). For further information on hand- and foot-operated controllers, reference is made to the assignee's copending patent application Ser. No. 17/677,003, published as U.S. Patent Publication No. 2002/0176238, the contents of which are hereby expressly incorporated by reference for all purposes. Preferably, the drive commands are received wirelessly, for example, using Bluetooth, IEEE 802.11 "Wi-Fi", ZigBee, or any other suitable wireless communication protocol. In one embodiment, a human operator located at a remote station uses two joysticks on a gamepad controller to provide three analog input values. In one embodiment, a left joystick is used to indicate a desired lateral movement (e.g., driving forward, backward, or side-to-side) while a right joystick is used to indicate a desired change in heading (e.g., to turn or rotate the body of the robot 100). In one embodiment, the left joystick y axis is used to indicate forward or backward movement, the left joystick x axis is used to indicate side-to-side movement, and the right joystick x axis is used to indicate a turn, while the right joystick y axis is not used. A controller 118, preferably located on robot 100, receives the three axis value inputs and calculates from them a desired wheel speed and heading for each differential swerve drive pod 145. The two motors 190 that drive each differential swerve drive pod 145 may be equipped with shaft encoders, and the robot controller may integrate the information gathered from the shaft encoders to determine the total relative rotation of the two motors 190, and from that, the current heading of the wheel 130 relative to the wheel 130's initial heading, which is preferably known. Thus, the robot controller always has access to each differential swerve drive pod 145's wheel 130 heading and can use that information, together with the desired heading to calculate an amount of differential rotation needed between the two motors 190 to cause the differential swerve drive pod 145's wheel 130 to turn to the desired heading. In one embodiment, the calculated desired wheel speed, wheel heading, current wheel heading, and current motor velocities are input into two PID feedback controllers, one to control the angle of the pod, and one to control the speed. The outputs of these two controllers interfere with each other to generate the final motor outputs.

Operation of the differential swerve drive pods 145 are further explained through the following examples. When starting from a dead stop, and the left joystick is moved in the direction aligned with the current wheel angle, which in the default case, is forward, the target angle of the pod will remain the same, and the target speed will increase. In this case, each motor in each pod will begin to drive (in opposite directions) in an attempt to reach the target speed, and thereafter slow down or speed up to maintain the target angle and reject disturbances.

When starting from a dead stop, and the left joystick is moved in a direction different from the current wheel angle, the angle that the left joystick is moved in is calculated, and then this angle is set as the new target angle, and the target speed is increased. The angle controller normalizes the current angle of the pod around the new target that has been set, and uses this difference as the error for the controller. These two motors will begin moving in the same direction to target the angle, and as the pod approaches its target angle, the angle controller's influence on the motor power will reduce. As this happens, the motors' movement will slow down as the pod's current angle approaches its target angle.

When moving in one direction and the left joystick is moved to a different angle and magnitude, the target angle and speed are changed. The angle controller normalizes the current angle of the pod around the new target that has been set, and uses this difference as the error for the controller. The two controllers both adjust to move towards these new targets, and the motors speed up and slow down accordingly to achieve these targets.

Consider next the operation when the robot 100 is at a dead stop and the right joystick is moved to the left or right to induce turning of the robot 100 to the left or right. As previously discussed relative to autonomous driving mode, turning the robot 100 is achieved through a "tank" drive maneuver. Since the robot 100 is at a dead stop, and the wheels are at the default angle, which is forward, the target speeds of wheels 130 are changed to equal and opposite values while their target angles remain the same. If the right joystick is moved to the left, to change the robot 100's orientation to the left, the left differential swerve drive pod 145's target speed will decrease (i.e., causing the left side of the robot 100 to move backward), and the right differential swerve drive pod 145's target speed will increase (i.e., causing the right side of the robot 100 to move forward). If the right joystick is moved to the right, the speed changes are inverted. After these target speeds have been set, the motors in the differential swerve drive pod 145 that has a negative target speed will both start moving (in opposite directions from one another) to cause wheel 135 to turn in a backward direction, and the motors in the differential swerve drive pod 145 that has a positive target speed will start moving (again, in opposite directions from one another) to cause wheel 135 to turn in the forward direction.

When the robot 100 is moving in one direction (e.g., through operation of the left joystick), and the right joystick is moved to the left or right to change the orientation of the robot 100, the direction the robot 100 is moving is used to calculate how the change in orientation will occur. When moving forward or backward, turning may use the difference in wheel speed to turn, but when moving left or right, turning may use the difference in wheel angle to turn. The usage of these different turning methods may be scaled in accordance with how much the robot 100 is moving in each direction. Once the methods for turning and the influence of each method are calculated, the target angles and target speeds are adjusted by the magnitude of the right joystick x axis. The adjustments for the target angles and speeds for the left and right differential swerve drive pods 145 may be the opposite of each other. Once the target angles and speeds have been set for each differential swerve drive pod 145, the motors may be commanded to speed up and slow down accordingly to achieve these new targets.

FIG. 6 shows a starboard side plate 600 and a port side plate 610. Plates 600, 610 include mounting holes 620 for attaching plates 600, 610 to a frame or chassis. Plates 600, 610 include mounting holes 630 for attaching other componentry, such as a control hub, expansion hub, or both. One or both plates 600, 610 may include a designated location 650 for attaching a configurable team membership marker, which may be used to indicate whether a robot 100 is participating in an event as a member of a team, and if so, which team. Plates 600, 610 may include decorations or insignia, including for example a team name, team number, team logo, and/or team sponsor. One or both plates 600, 610 may include a notch 670 to accommodate additional componentry, such as a camera, for example, a Intel RealSense T265 camera available from Intel Corporation of Santa Clara, CA. The Intel RealSense T265 camera utilizes a Visual Simultaneous Localization and Mapping (VSLAM) system to provide location and orientation tracking information that may be utilized as part of an autonomous driving mode program. The VSLAM system uses reference points from successive camera frames in order to track the exact position and heading of the T265 camera. Programming libraries are provided for C++ code by Intel, and these libraries may be accessed by programs written using Java using a suitable open source wrapper library, such as the ftc265 library available from user pietroglyph on GitHub. In addition to the VSLAM system, supplemental techniques such as three-wheel odometry (e.g., employing odometry omniwheels 120) may be employed to further stabilize the final positional output. When combining such techniques, the vector of change calculated from the distance measured by each omniwheel may require an adjust to account for the change in robot heading as compared to an initial heading.

Figures 7A, 7B, 7C:
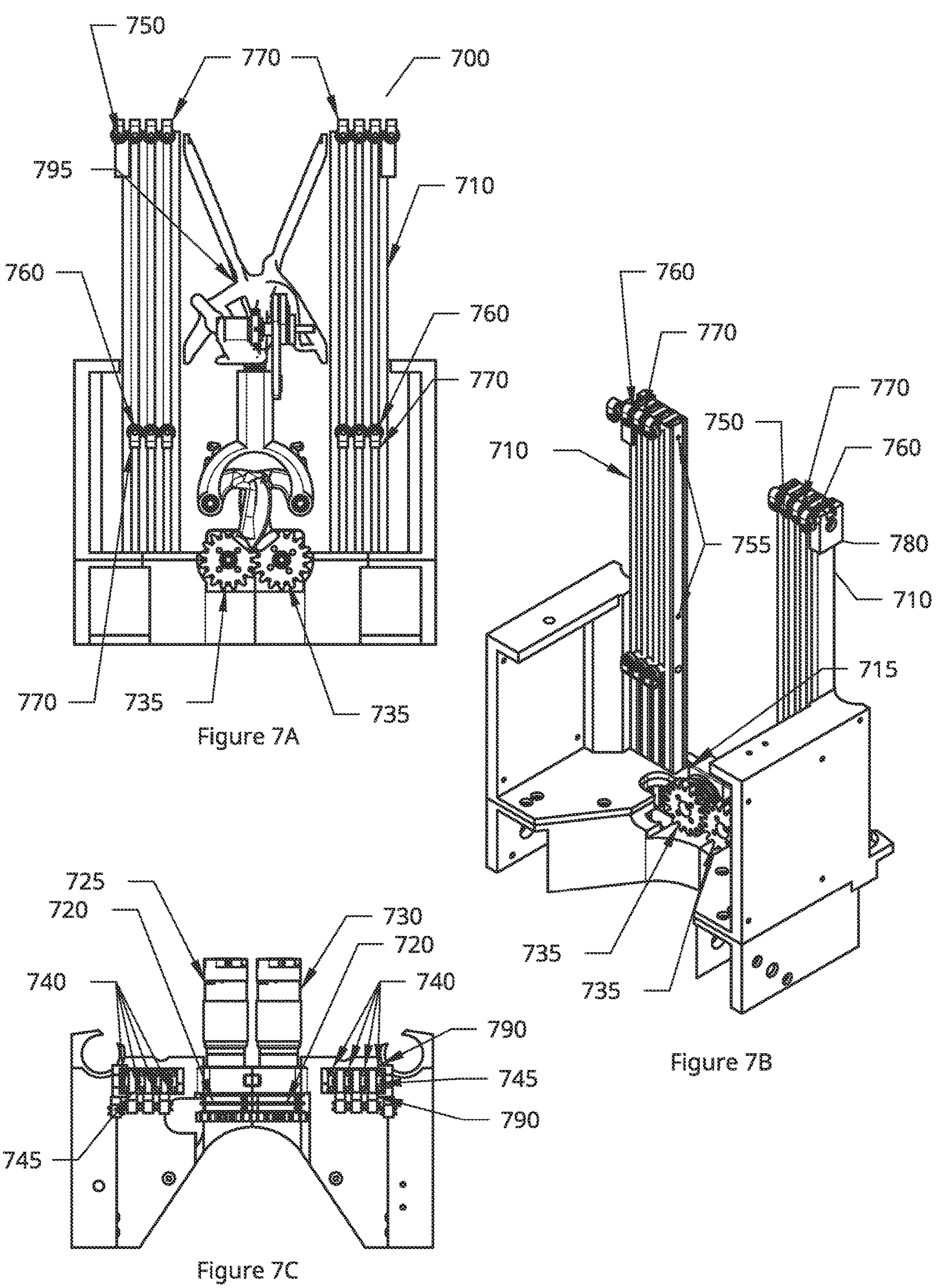
FIG. 7A is a front view of an exemplary lift mechanism.
FIG. 7B is a perspective view of an exemplary lift mechanism.
FIG. 7C is a bottom view of an exemplary lift mechanism.

Further details of one embodiment of lift mechanism 125 are illustrated in FIGS. 7A-7C. FIG. 7A illustrates a front view of an exemplary lift mechanism 700, while FIG. 7B illustrates a corresponding perspective view, and FIG. 7C illustrates a corresponding bottom view. Lift mechanism 700 is designed to lift vertically two sets of linear slides 710. In one embodiment, the linear slides 710 have a maximum extension of up to about 3 feet. The linear slides 710 are positioned parallel to each other, and in their lowered positions, have their downward facing ends 740 situated in insets 715 in a base platform. By restricting movement of the lower portions of each linear slide 710, the insets 715 help to stabilize the linear slides, and the insets 715 also guide each linear slide 710 as it descends from a raised position to a lowered position. The vertical movement of the linear slides 710 is driven using a continuous stringing technique. For each linear slide 710, a string is attached to a pulley 720 mounted on the base platform. Each pulley 720 is driven by a motor (725 or 730). The motor may directly drive the pulley, or the motor may be coupled to the pulley via a gearbox. The motor and optional gearbox are preferably designed to provide sufficient torque and speed to raise the linear slide 710 from its lowest position to its highest position in a desired amount of time. For example, it may be desirable for the linear slides 710 to be raisable in less than about five seconds.

Also attached to the same axle as the pulley 720 is a gear 735 that enmeshes with another gear 735 of the other pulley 720. These gears 735 ensure that the two linear slides 710 raise and lower together. To obtain feedback information to control the raising and lowering of the linear slides 710, motor 725 includes an internal rotation encoder that provides a read-out of the relative rotational position of motor 725. This encoder information may be calibrated to the minimum and maximum extension positions of the linear slides 710. The encoder information may then be used in software to limit or cut power to the motors 725 and 730 at or near these minimum and maximum positions, thereby preventing the motors 725 and 730 from attempting to drive the linear slides 710 past their minimum and maximum extents, which could cause damage. In some embodiments, motor 730 instead of motor 725 may include an internal rotation encoder, while in other embodiments, both motor 725 and 730 may include an internal rotation encoder. In embodiments in which each of motors 725 and 730 include an internal rotation encoder, the encoder information from both motors may be compared; where the encoder information from the two motors differs by more than a chosen threshold value (for example, 1% or 5%), an error condition may be signaled and operation of motors 725 and 730 may be reduced or halted.

Each linear slide 710 comprises a number of slides 740, with each pair of adjacent slides 740 separated by a rectangular spacer 745. As illustrated, there are four slide pairs in each slide 710. The rectangular spacer 745 may extend only a portion of the length of a slide pair, for example, about ⅔ of its length. Each rectangular spacer 745 includes two holes 750, 755 for mounting bearings 760. Each bearing 760 has a u-shaped loop 770 which goes around it to capture and retain the string on the bearing 760 in the event that the string momentarily goes slack (for example, while lowering the linear slides 710). Mounted to the outer-most slide pair is a larger bracket 780 for holding a bearing 760. The bracket 780 partly extends around the sides of the slide pair to counteract the force of the string which produces a force that urges the outermost slide pair to rotate.

On the innermost slide pairs, the holes 750 and 755 that would otherwise be used for mounting a bearing are instead used to attach a passthrough support 795, which is further described below.

As already mentioned, the lift mechanism is powered by two motors 725 and 730. As the motors turn, string that is threaded through the bearings 760 is wound onto the pulleys 720, causing the upper and lower bearings 760 to move towards each other, and hence, causing the passthrough support 795 to be raised up. The pulleys 720 may optionally be divided pulleys, with string also threaded through the linear slides in an opposing fashion; in this manner, the lowering of passthrough mechanism 795 is also achieved under power and is not merely reliant on gravitational force to bring it down.

Further details of lift mechanisms using linear slides are provided in U.S. Pat. No. 9,864,369 to Gravel et al., which is assigned to the assignee of the present disclosure and the contents of which is incorporated herein for all purposes.

Figures 8A, 8B, 8C:
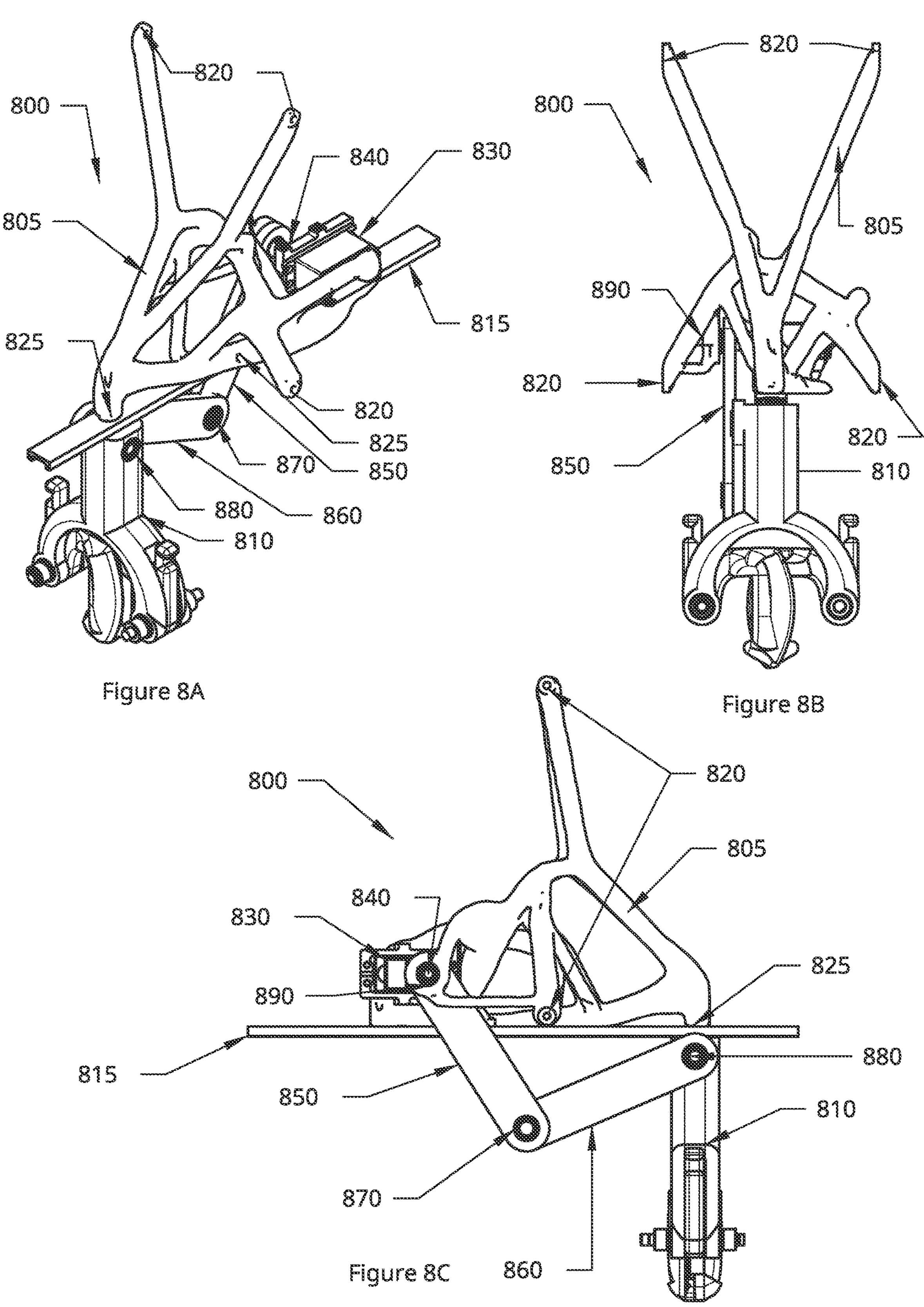
FIG. 8A is a perspective view of an exemplary passthrough mechanism.
FIG. 8B is a rear view of an exemplary passthrough mechanism.
FIG. 8C is a side view of an exemplary passthrough mechanism.

Turning now to FIGS. 8A-8C, an exemplary passthrough mechanism 800 will now be described. The passthrough mechanism 800 includes a frame 805 designed to have a horizontal slide 815 mounted to it that can support a moveable hanging structure, such as the plunger claw 810. Horizontal slide 815 is preferably a C-channel made of aluminum, steel, or another metal. As previously discussed, the frame 805 may be mounted to linear slides (such as linear slides 710 shown in FIGS. 7A-7C) to allow for vertical repositioning of the passthrough mechanism 800 over a range of heights. In one embodiment, the passthrough mechanism may be vertically moved via such linear slides over an approximately 36-inch range, although other heights and distances may be readily achieved in other embodiments. The frame 805 is preferably composed of a lightweight plastic to minimize the movement of a robot's center of gravity when the passthrough mechanism 800 is lifted to its maximum height, thereby reducing the likelihood of the robot tipping over.

Frame 805 may be mounted to linear slides (or another structure) via four holes 820, which may be spaced so as to align with holes 750, 755 on linear slides 710. Thus, frame 805 may be mounted to linear slides via screws or bolts. Frame 805 has further holes 825 for mounting horizontal slide 815, again through the use of screws or bolts. Preferably there are at least two holes 825 providing for two attachment points, although in other embodiments there may be more or fewer holes 825. For example, it may be desirable in some embodiments to provide for four holes 825, as they would provide for secure attachment of horizontal slide 815 to frame 805 even in the event that one screw or bolt were to become loose or to fall out.

Hanging from horizontal slide 815 is a claw mechanism 810 that is adapted to slide back and forth along the horizontal slide 815, thus allowing the claw mechanism 810 to be positioned at either the front or the back of the structure (e.g., the robot 100). Motive power for sliding claw mechanism 810 along horizontal slide 815 may be provided by a servo 830, which may be mounted via screw holes 840 on frame 805 that position the servo 830 to be offset from the centerline of the horizontal slide 815. The servo may be provided with a d-shaft 840 that extends through a support bearing hole 890 in the frame 805. The d-shaft 840 may further fixedly engage with one end of a first bar 850, while a second end of the first bar 850 is rotationally coupled to a first end of a second bar 860. A second end of the second bar 860 may be rotationally coupled to a set of bearings 880 that are coupled to the claw mechanism 810. Thus, as the d-shaft 840 of servo 830 rotates, the forces generated on bars 850, 860 induces the claw mechanism 810 to slide along the horizontal slide 815. The lengths of bars 850, 860 are preferably the same and may be sized such that at their full extension (e.g., when bars 850, 860 are horizontal and thus parallel with horizontal slide 815) the claw mechanism 810 is substantially at either end of horizontal slide 815.

In one embodiment, the shape of frame 805 may be designed with the aid of computer-assisted generative design software, such as is commercially available in tools such as Autodesk Fusion 360. The use of such design-assistive software may aid in optimizing the shape of frame 805 to meet structural strength requirements with a minimum amount of material. The resulting shape may be 3D printed. In one embodiment, the inventors found that generative design software was able to optimize the shape of frame 805 to provide equivalent strength and stiffness characteristics to an initial human design while reducing the weight of frame 805 by approximately seventy percent.

Figures 9A, 9B:
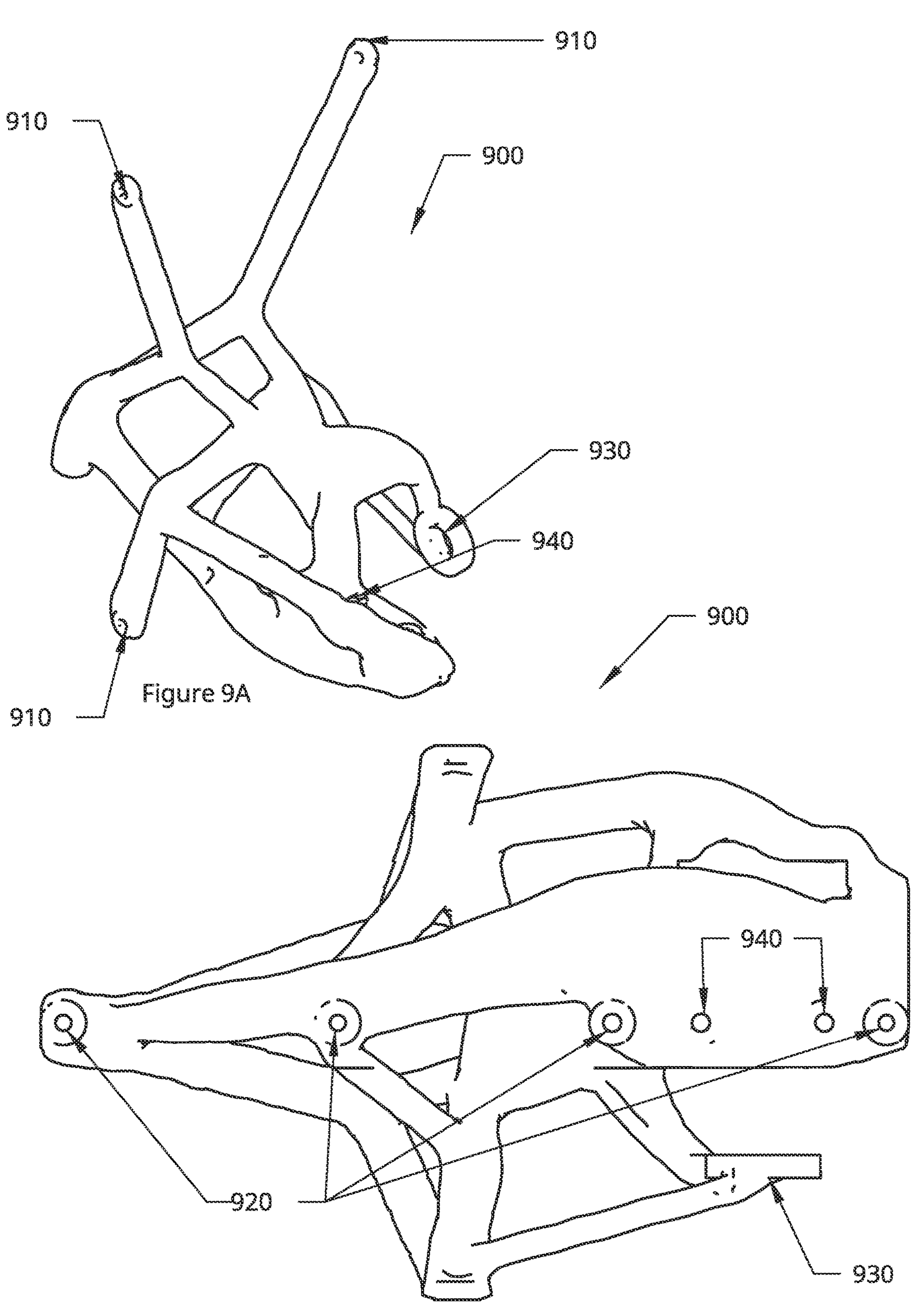
FIG. 9A is a perspective view of an exemplary frame for a passthrough mechanism.
FIG. 9B is a bottom view of an exemplary frame for a passthrough mechanism.

FIGS. 9A and 9B show further details of one embodiment of a frame 900, similar to frame 805 shown in FIGS. 8A-8C. FIG. 9A is a perspective view of frame 900, while FIG. 9B is a bottom view of frame 900. The frame 900 may include mounting holes 910 for attaching frame 900 to a support structure, such as linear slides as discussed previously. The frame 900 may further include mounting holes 920 for attaching a horizontal slide to the frame 900. The frame 900 may further include mounting holes 940 for attaching a servo motor. The frame 900 may further include a support bearing hole 930 for supporting one end of a servo motor drive shaft.

Figures 10A, 10B:
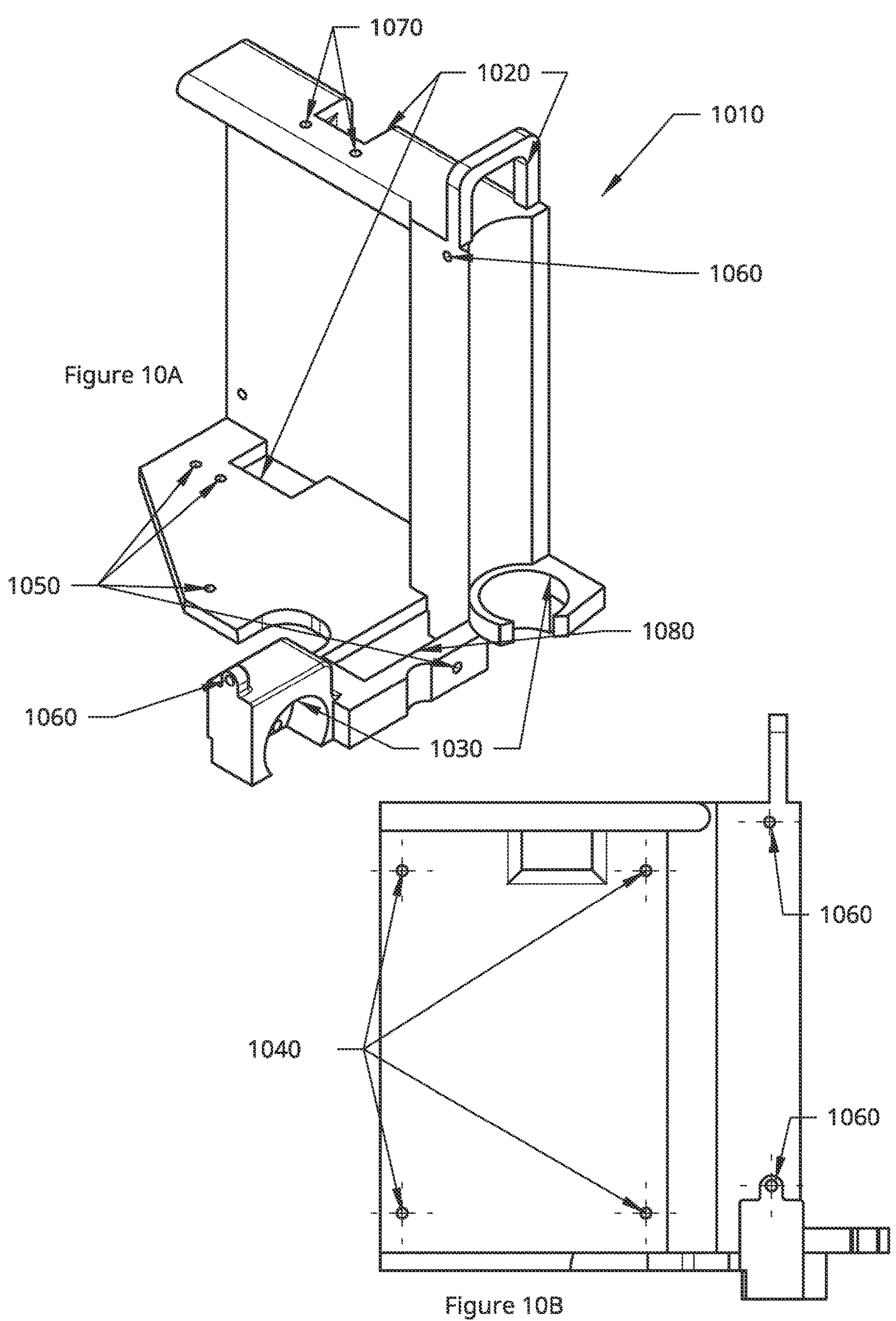
FIG. 10A is a perspective view of an exemplary frame designed to support mounting of other components.
FIG. 10B is a side view of an exemplary frame designed to support mounting of other components.

FIGS. 10A and 10B show a frame 1010 portion of a robot chassis that is designed to support mounting of various components. In some embodiments, frame 1010 may correspond to frame 135 shown in FIG. 1A. Frame 1010 may include mounting points for components such as one or more cameras, a communications hub, side plates, wiring, one or more motors, and other frame components of an overall robot chassis. For example, frame 1010 may include apertures 1020 through which communications wiring, power wiring, or other wiring components may be passed. Frame 1010 may also include one or more motor mount cutouts 1030, which may be sized to precisely accommodate one or more motors. For example, a motor mount cutout 1030 may be sized to provide an interference fit for a motor. Frame 1010 may include mounting holes 1040 aligned to support attachment of a communications hub, such as a REV Robotics Expansion Hub or a REV Robotics Control Hub, both commercially available from REV Robotics of Carrollton, Texas. Frame 1010 may include holes 1050 for mounting the frame 1010 to other frame or chassis components; for example, frame 1010 may be mounted via holes 1050 to base platform 170 shown in FIG. 1A. Frame 1010 may include mounting holes 1060 for attaching other frame or chassis components, such as linear slides 105 shown in FIG. 1A. Frame 1010 may include apertures 1080 sized and shaped to accommodate the passage of linear slides as discussed with respect to FIG. 1A. For example, in some embodiments, apertures 1080 may correspond to insets 715 discussed with respect to FIG. 7B. Frame 1010 may also include camera mounting holes 1070 for mounting one or more cameras to frame 1010.

Figures 11A, 11B, 11C, 11D:
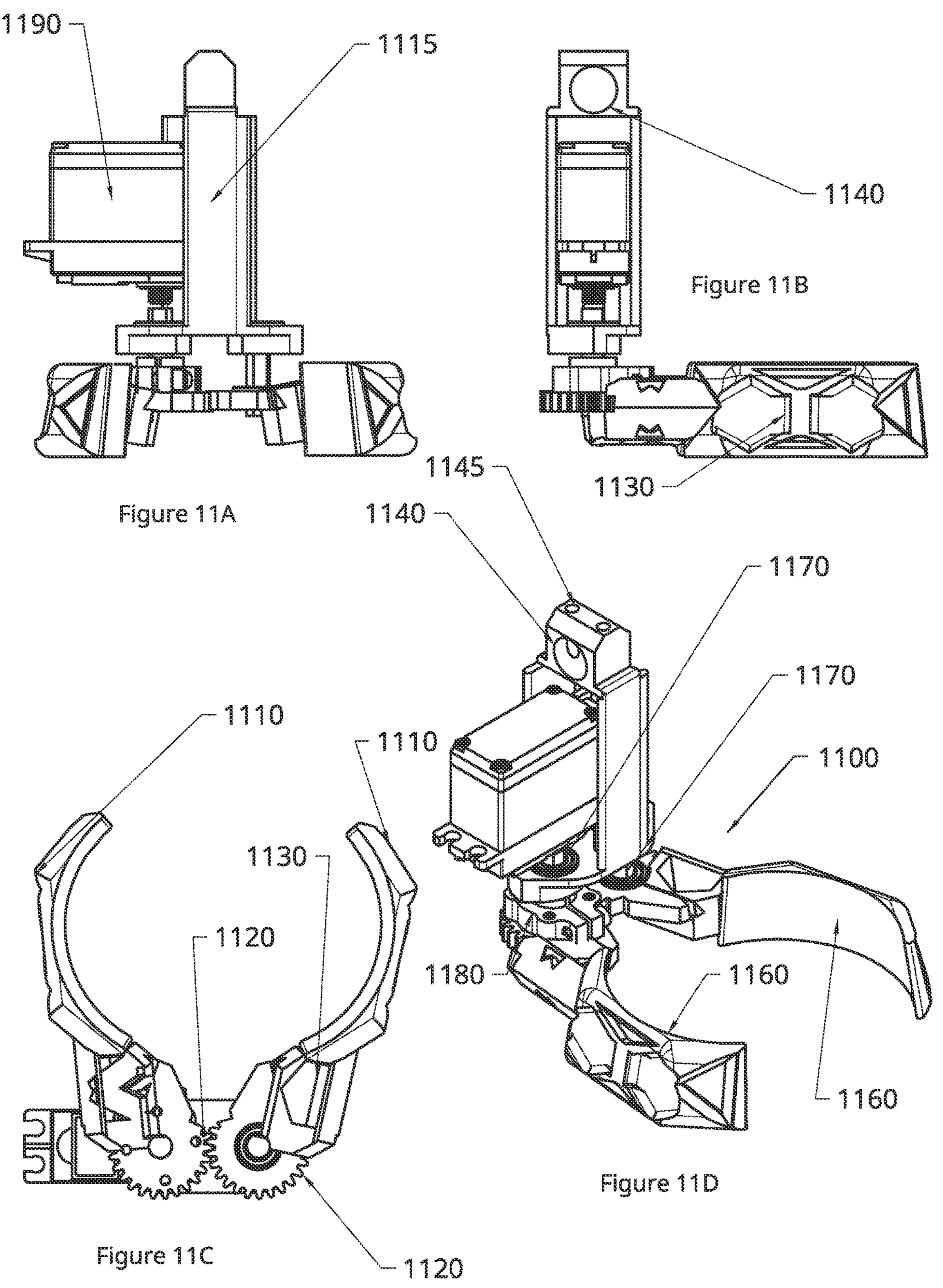
FIG. 11A is a front view of an exemplary claw mechanism.
FIG. 11B is a side view of an exemplary claw mechanism.
FIG. 11C is a bottom view an exemplary claw mechanism.
FIG. 11D is a perspective view an exemplary claw mechanism.
Figures 12A, 12B, 12C, 12D, 12E:
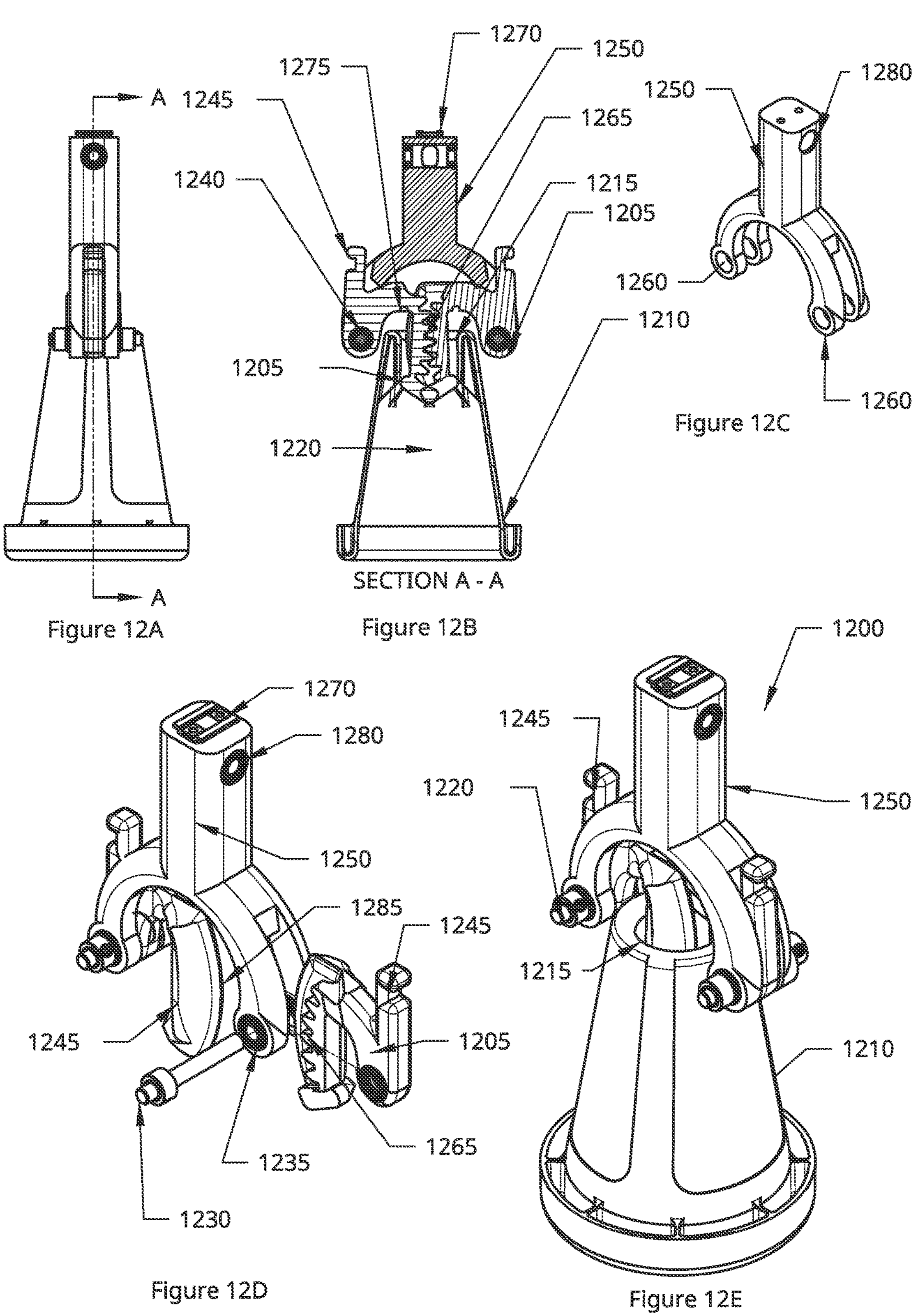
FIG. 12A is a side view of an exemplary claw mechanism.
FIG. 12B is a cutaway view of an exemplary claw mechanism.
FIG. 12C is a perspective view of a central hub.
FIG. 12D is an exploded perspective view of a portion of an exemplary claw mechanism.
FIG. 12E is a perspective view of an exemplary claw mechanism.

FIG. 11D illustrates a perspective view of one embodiment of a claw mechanism 1100. FIGS. 11A-11C illustrate corresponding front, side, and bottom views (respectively) of claw mechanism 1100. Claw mechanism 1100 includes two claws 1110 that may have interior-facing surfaces 1160 that are curved and angled so that in a closed position, the two claws 1110 frictionally grip an outer surface of a cone (for example, cone 1210 shown in FIG. 12E). In one embodiment, the interior-facing surfaces 1160 have a radius of curvature approximately equal to that of cone 1210 at its vertical midpoint. In one embodiment, the interior-facing surfaces 1160 have a vertical slope approximately equal to that of cone 1210.

Each claw 1110 is fixedly attached by a clamping hub 1180 to a D-shaft 1170, and by the D-shaft 1170 to a central hub 1115. For one claw 1110, its D-shaft 1170 engages with a servo 1190 either directly or through a gearbox. A gear-toothed portion 1120 of each claw 1110 engages with a gear-toothed portion 1120 of the other claw 1110, synchronizing their movement. Thus, when servo 1190 rotationally operates one claw 1110, the other claw 1110 moves in synchronized fashion, meaning that the two claws 1110 will open and close together. Each claw 1110 may be PLA 3D printed such that gear-toothed portion 1120 is an integral part of claw 1110. To reduce its weight, claw 1110 may include one or more voids 1030.

Central hub 1115 may include screw holes 1145 for mounting claw mechanism 1100 to a carriage slider (not shown, but similar to carriage slider 1270 shown in FIGS. 12B, 12D, and 12E) adapted to slide along a C-channel, for example, the C-channel of horizontal slide 815 shown in FIG. 8A. Central hub 1115 may include a bearing hole 1140 for bearings (not shown). Through the bearings, the claw mechanism 1100 may be coupled to a positioning mechanism capable of moving claw mechanism 1100 laterally, such as second bar 860 shown in FIG. 8C.

FIGS. 12A-12E show another embodiment of a claw mechanism 1200, more specifically, an internal plunger claw mechanism 1200. Internal plunger claw mechanism 1200 includes two contoured fingers 1205 designed to rotate inward when pressed into the top of a cone 1210 allowing contoured fingers 1205 to pass through a hole 1215 in cone 1210. With the contoured fingers 1205 located in a cone cavity 1220, the weight of cone 1210 urges the contoured fingers 1205 rotate outward, increasing the friction grip between the contoured fingers 1205 and an inner surface of cone cavity 1220. Thus, once the contoured fingers 1205 are inserted into hole 1215 of cone 1210, the claw mechanism 1200 may support the weight of cone 1210. If claw mechanism 1200 is vertically lifted (e.g., through the operation of linear slides as discussed previously), cone 1210 may also be vertically lifted.

Figures 13A, 13B:
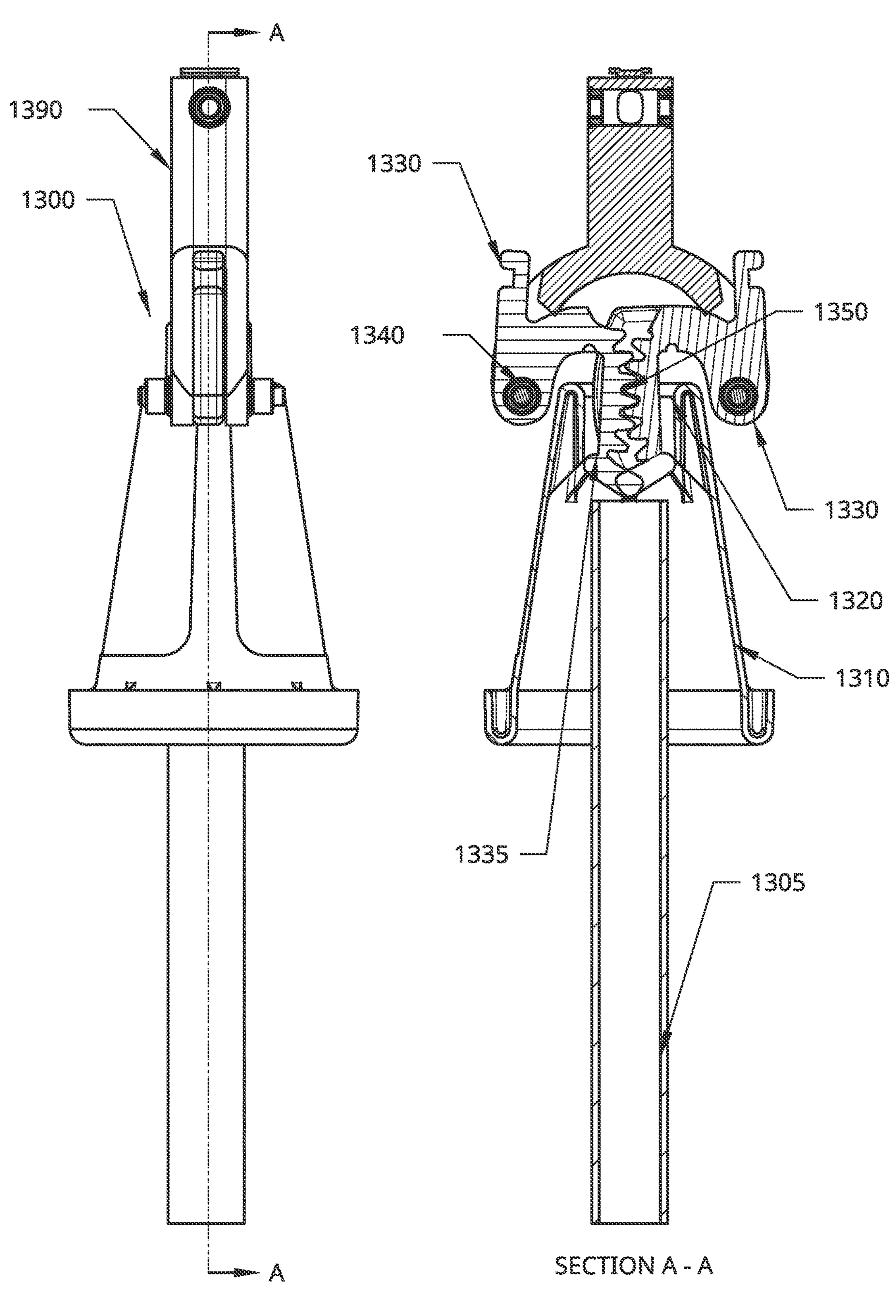
FIG. 13A is a side view of an exemplary claw mechanism gripping a cone over a pole.
FIG. 13B is a cutaway view of an exemplary claw mechanism gripping a cone over a pole.

The operation of releasing a cone 1310 from claw mechanism 1300 will now be described with reference to FIGS. 13A-13B. By lowering central hub 1390, claw mechanism 1300 and cone 1310 (e.g., via operation of linear slides as discussed previously) onto a pole 1305, the pole 1305 impresses on a conical tip formed by contoured fingers 1330. The upward force on contoured fingers 1330 urges their rotation about pivot points 1340 with their movement synchronized by gear patterns 1350. This rotational movement draws the angled tips 1335 together, releasing the friction grip between contoured fingers 1330 and an inner surface of cone cavity 1320. With the weight of cone 1310 no longer supported by contoured fingers 1330, cone 1310 will fall vertically onto pole 1305.

Returning now to FIGS. 12A-12E, the remaining components of claw mechanism 1200 will now be described. Claw mechanism 1200 includes a central hub 1250. Similar to central hub 1115 discussed in FIGS. 11A-11D, central hub 1250 includes screw holes for mounting a carriage slider 1270 and a bearing hole 1280 for bearings and attachment to a positioning mechanism capable of moving claw mechanism 1200 laterally, such as second bar 860 shown in FIG. 8C.

Each contoured finger 1205 may be rotationally coupled to central hub 1250 via a shaft 1230 that passes through bearings 1235 mounting in bearing holes 1260 of central hub 1250 and a bearing hole 1240 in each contoured finger 1205. To increase the lateral force applied by angled tips of contoured fingers 1205 to a cone 1210, a rubber band or other bias-force device may be placed around indents 1245 in the contoured fingers 1205, urging the contoured fingers 1205 to rotate about shafts 1230 and thus press outwardly toward the inner surface of cone cavity 1220. In some embodiments, the weight of cone 1210 is sufficient to cause an adequate friction grip and no rubber band or other bias-force device is used.

Each contoured finger 1205 may have an integrated gear pattern 1265 that is designed to enmesh with a corresponding gear pattern 1265 on the other contoured finger 1205. Thus, enmeshed gearing of the contoured fingers causes them to rotate together to uniformly intake and release the cone, preventing jamming. The gear patterns 1265 also prevent each contoured finger 1205 from rotating about its shaft 1230 independently of the other contoured finger 1205, which aids in ensuring that claw mechanism 1200 works smoothly to engage and disengage from cone 1210.

Each contoured finger 1205 may have a shape that limits the distance to which contoured fingers 1205 can fit into cone cavity 1220. For example, each contoured finger 1205 may have an upper contour 1275 that prevents cone 1210 from sliding onto contoured fingers 1205 by more than a predetermined amount, for example, between one and four inches. As another example, each contoured finger 1205 may have a side contour 1285 (generally opposite the gear pattern 1265) that aids in exerting a downward pressure on cone 1210 when the angled tips of the contoured fingers 1205 are pressed upward.

Figure 14:
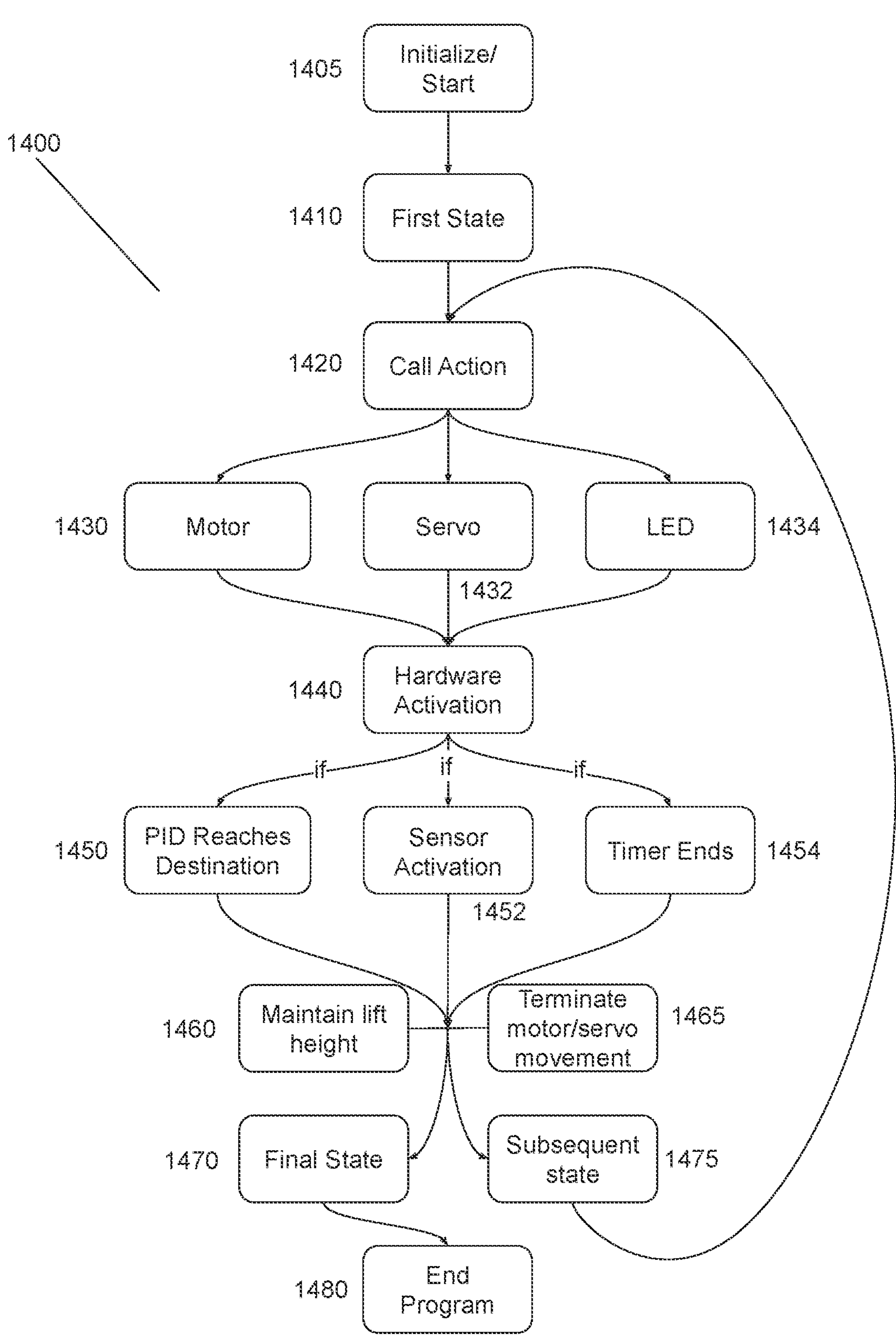
FIG. 14 illustrates an exemplary finite state machine for controlling operation of a robot.

FIG. 14 illustrates a finite state machine 1400 for controlling the operation of a robot, for example robot 100 illustrated in FIG. 1. In some embodiments, operation of the robot 100 may be autonomous. The finite state machine 1400 begins in an Initialize/Start state 1405 during which the robot's components may be initialized. For example, registers or counter values may be reset to known values (e.g., zero) and moveable components may optionally be calibrated and/or moved to a predetermined starting position. For example, linear slides 105 may be placed or returned to a lowered position. The robot 100 may itself be manually positioned in a predetermined location on a drivable field, such as being placed upright on its wheels 120, 130 and proximate to (and preferably with one side of robot 100 squarely aligned with) a wall or other boundary. Upon completion of the initialization state 1405, the state may be automatically advanced to a First State 1410.

In First State 1410 and the remaining states of FIG. 14, the robot 100 iteratively checks for an input or condition that may cause a state change. The robot 100 remains in each state until a state change occurs. State changes are conditional and may be advantageously programmed as a series of if-then-else logic blocks, which may detect whether an action or other state operation has completed successfully. State changes may be triggered by a variety of inputs or conditions, including a reception of a signal or input, an expiration of a timer, a PID control reaching within its dead zone, activation of a touch sensor, measurement by a distance sensor of a predetermined value or of a value within a predetermined range. For example, robot 100 may transition out of First State 1410 upon receiving a "go" command from a remote computer or human operator. Alternatively, transition to a subsequent state may occur automatically upon completion of an action or other state operation.

Following First State 1410, the robot 100 may enter a Call Action state 1420. In the Call Action state 1420, one of three potential actions may be activated by further transitioning to a Motor state 1430, a Servo state 1432, or a LED state 1434. In a Motor state 1430, a motor on robot 100 is selected for operation. In Servo state 1432, a servo on robot 100 is selected for operation. In LED state 1434, a LED light on robot 100 is selected for operation. In each of states 1430, 1432, and 1434, additional parameters may be selected or specified to control the selected operation. For example, in Motor state 1430, a motor velocity and a motor direction may be selected. In Servo state 1432, a desired servo position may be selected or specified, which may be provided as a decimal value in the range of values between 0 and 1. In LED state 1434, a desired LED color or pattern of colors may be selected or specified for one or more LEDs. Subsequently, the robot may transition to a Hardware Activation state 1440 in which the item selected for operation is activated. For example, where a motor was selected for operation in Motor state 1430, the selected motor may be energized to rotate in a selected direction at a selected velocity. Where a servo was selected for operation in Servo state 1432, the selected servo may be sent a command to move to the selected position. Where one or more LEDs were selected for operation in LED state 1434, the one or more LEDs may be energized in accordance with the selected color(s) or pattern of colors. In one embodiment, the LEDs may be controlled so as to indicate information about the current state, or recent previous state, or expected next state of the robot 100.

Following Hardware Activation state 1440, the robot 100 may automatically transition to one or more optional sensing states, specifically PID Reaches Destination state 1450, Sensor Activation state 1452, or Timer Ends state 1454.

The robot 100 may transition to PID Reaches Destination state 1450 upon sensing that a PID controller has reached a target value or value range, which may have been previously specified or selected, for example in Motor state 1430. Upon sensing that the PID controller has reached the target value or value range, the robot 100 may transition to a Terminate Motor/Servo Movement state 1465, in which the previously selected motor or servo is de-energized or otherwise commanded to stop moving. In addition to transitioning to a Terminate Motor/Servo Movement state 1465, the robot 100 may additionally transition to a Maintain Lift Height state 1460, discussed further below. Alternatively, the robot 100 may transition to a Final State 1470 or a Subsequent State 1475.

The robot 100 may transition to Sensor Activation state 1452 upon sensing that a sensor, such as a touch sensor or a distance sensor, has been activated. Activation of a sensor may be associated with physical contact or from sensing that a distance from a sensor to an object is less than a predetermined distance. Upon sensor activation of a sensor, the robot 100 may transition to Terminate Motor/Servo Movement state 1465, in which the previously selected motor or servo is de-energized or otherwise commanded to stop moving. In addition to transitioning to a Terminate Motor/Servo Movement state 1465, the robot 100 may additionally transition to a Maintain Lift Height state 1460, discussed further below. Alternatively, the robot 100 may transition to a Final State 1470 or a Subsequent State 1475.

From the Terminate Motor/Servo Movement state 1465, the robot 100 may transition to a Maintain Lift Height state 1460, Final State 1470, or Subsequent state 1475.

Upon reaching Maintain Lift Height state 1460, a command may be given to one or more PID controllers, such as PID controllers for motors 180 that control the height of the linear slides 105, to maintain a selected or specified value, such as their current PID value. Thus, the motors 180 will counteract any undesired movement of the linear slides that may be caused by gravity or other external forces, thereby ensuring that the linear slides remain at their current vertical positions. From the Maintain Lift Height state 1460, the robot 100 may transition to Final State 1470, or Subsequent state 1475.

Upon reaching Final State 1470, all power to all motors and servos is terminated, and control of all LED lights stops. All execution of autonomous activity may then cease by transitioning to an End Program state 1480.

Upon reaching Subsequent State 1475, robot 100 may select a next action to be taken and then transition to Call Action state 1420 to perform that action. By iteratively initiating a series of actions in this manner, robot 100 may be programmed to perform a complex sequence of actions.

In some embodiments, autonomous operation of a robot, such as robot 100, may be further enhanced by the incorporation of complex sensory input capabilities, such as a computer vision system based on multiframe image analysis of data provided by a digital camera. For example, an instruction to control the autonomous operation of a robot may be provided via one or more items or images in the robot's environment. In one embodiment, an item having a variable number of circles (e.g., between zero and two) on it may be placed in the robot's environment. The robot may be equipped with an onboard controller capable of analyzing one or more image frames from an onboard digital camera, thereby determining the number of visible circles and using that information to direct the operation of the robot, for example, by driving the robot to a different predetermined location depending on the number of circles. To analyze each image frame, color image data from the digital camera may be transformed to a grayscale and, optionally, cropping the image to focus the analysis on a predetermined portion of the camera's field of view. Then a known technique such as edge detection and/or a Hough Circle Transform may be used to locate the center and radius of each detectable circular item in the image. A count of the number of detected circles may then be taken. The inventors have discovered, however, that from time to time a Hough Circle Transform may erroneously identify a circle or may erroneously fail to identify a circle. To improve the reliability of the image analysis, in some embodiments, the digital camera may be a video camera capable of providing a rapid series of image data, for example, 30 image frames per second. Each image frame may be separately analyzed as previously explained, and the cumulative detection results across many frames are analyzed. In one embodiment, three separate counts are maintained, with the first count corresponding to the number of times that zero circles are detected, the second count corresponding to the number of times that exactly one circle is detected, and the third counter corresponding to the number of times that two circles are detected. After completing the image analysis of a single image frame, the relevant counter is incremented. A reliable detection of two circles may then be made if the third counter is at least 40 while the second counter remains less than 20. A reliable detection of one circle may be made if a reliable detection of two circles has not been made and if the second counter was at least 20. A reliable detection of zero circles may be made if a reliable detection of two circles has not been made, a reliable detection of one circle has not been made, and the first counter is greater than the sum of the second counter and the third counter. In some embodiments, the reliable detection of zero circles may also require that a predetermined minimum number of image frames be analyzed, for example, 10 image frames. In other embodiments, a predetermined number of image frames may be processed (for example, 60 frames) after which the counter with the greatest value is taken as corresponding to the number of detected circles.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A robot apparatus, comprising:

a base platform;

a first differential swerve drive pod attached to the base platform;

a second differential swerve drive pod attached to the base platform;

a first odometry omniwheel attached to the base platform;

a second odometry omniwheel attached to the base platform;

at least one side plate attached to the base platform, a lift system comprising:

a first linear slide; and a second linear slide mechanically coupled to the first linear slide such that raising and lowering of the first linear slide is synchronized with raising and lowering, respectively, of the second linear slide;

at least one programmable controller physically attached to the side plate and electrically coupled to provide one or more electrical signals to each of the first and second differential swerve drive pods, the at least one programmable controller being further electrically coupled to receive tracking information from the first and second odometry omniwheels.

2. The robot apparatus of claim 1 wherein:

the first differential swerve drive pod comprises a first motor and a second motor; and the at least one programmable controller is electrically coupled to provide a first electrical signal to the first motor and to provide a second electrical signal to the second motor.

3. The robot apparatus of claim 1 further comprising:

a camera incorporating a visual simultaneous localization and mapping system, the camera being physically attached to the side plate and providing localization and mapping information to the at least one programmable controller.

4. The robot apparatus of claim 1 wherein the base platform includes:

a first hole through which at least a portion of the first linear slide passes when the first linear slide is in a low position; and a second hole through which at least a portion of the second linear slide passes when the second linear slide is in a low position.

5. The robot apparatus of claim 1 further comprising:

a passthrough transport system including:

a frame attached to and between the first linear slide and the second linear slide, a horizontal slide, and a moveable structure adapted to slide along the horizontal slide.

6. The robot apparatus of claim 5 wherein the moveable structure comprises a claw adapted to grasp an exterior surface of a cone.

7. The robot apparatus of claim 5 wherein the moveable structure comprises a claw adapted to grasp an interior surface of a cone.

8. The robot apparatus of claim 7 wherein the claw comprises two contoured fingers that intercouple through enmeshed toothed gearing.

9. The robot apparatus of claim 8 wherein the claw is adapted to support the weight of the cone through a friction grip between an angled tip of each contoured finger and an interior surface of the cone.

10. The robot apparatus of claim 5 wherein the passthrough transport system further comprises:

a servo motor attached to the frame;

a first bar having a first end and a second end, the second end of the first bar being opposite the first end of the first bar, the first end of the first bar being coupled to a shaft of the servo motor;

a second bar having a first end and a second end, the second end of the second bar being opposite the first end of the second bar, the first end of the second bar being attached to the second end of the first bar, the second end of the second bar being attached to the moveable structure, whereby rotation of the shaft of the servo motor causes the moveable structure to slide along the horizontal slide.

11. The robot apparatus of claim 1 wherein the programmable controller contains machine readable instructions that, when executed by a processor within the programmable controller, cause the programmable controller to autonomously produce signals to control the operation of the robot apparatus.

12. The robot apparatus of claim 11 wherein the machine-readable instructions further cause the programmable controller:

to receive a sequence of images of an object from a camera, to analyze each image of the sequence of images to determine a number of circles in the image, and to synthesize from the entire sequence of images a reliable number of circles depicted on the object.

13. The robot apparatus of claim 11 wherein the machine-readable instructions further cause the programmable controller to operate the robot apparatus according to a finite state machine.

14. The robot apparatus of claim 1 wherein the programmable controller contains machine readable instructions that, when executed by a processor within the programmable controller, cause the programmable controller to wirelessly receive control instructions from a remote station and, in response to the control instructions, to produce signals to control the operation of the robot apparatus in accordance with the control instructions.

15. The robot apparatus of claim 14 wherein the machine-readable instructions further cause the programmable controller to:

maintain a current wheel heading for the first differential swerve drive pod;

calculate from the control instructions a desired wheel speed and a desired wheel heading for the first differential swerve drive pod; and calculate from the current wheel heading, the desired wheel speed, and the desired wheel heading: (i) a first motor speed and direction and (ii) a second motor speed and direction;

wherein the one or more electrical signals provided to the first differential swerve drive pod are based on the calculated first motor speed and direction and the calculated second motor speed and direction.

16. The robot apparatus of claim 1 wherein the first differential swerve drive pod comprises a first compound gear and a second compound gear, the first compound gear being rotatable independently relative to the second compound gear.

17. The robot apparatus of claim 16 wherein:

the first compound gear comprises an inner surface coupled to a first set of four v-groove bearings; and the second compound gear comprises an inner surface coupled to a second set of four v-groove bearings.

18. The robot apparatus of claim 16 wherein the first different swerve drive pod further comprises a first motor and a second motor, the first motor being controllable independently from the second motor.

19. The robot apparatus of claim 16 wherein:

the first differential swerve drive pod further comprises a wheel attached to an axle, the axle having a central axis, and a rotation of the first compound gear in a clockwise direction at a first speed simultaneous with a rotation of the second compound gear in a counterclockwise direction at the first speed induces the wheel to rotate about the central axis without rotating about a vertical axis.

20. The robot apparatus of claim 16 wherein:

the first differential swerve drive pod further comprises a wheel attached to an axle, the axle having a central axis, and a rotation of the first compound gear in a clockwise direction at a first speed simultaneous with a rotation of the second compound gear in a clockwise direction at the first speed induces the wheel to rotate in a clockwise direction about a vertical axis without rotating about the central axis.

* * * * *